(12) United States Patent
Lee et al.

(10) Patent No.: US 6,766,525 B1
(45) Date of Patent: Jul. 20, 2004

(54) METHOD AND APPARATUS FOR EVALUATING TELEVISION PROGRAM RECOMMENDERS

(75) Inventors: Kwok Pun Lee, Yorktown Heights, NY (US); J. David Schaffer, Wappingers Falls, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/500,306

(22) Filed: Feb. 8, 2000

(51) Int. Cl.$^7$ .............................................. H04N 5/445
(52) U.S. Cl. ........................................ 725/46; 725/146
(58) Field of Search ............................ 725/46, 9, 14, 725/138, 115, 135, 149, 146, 114, 116, 93, 143

(56) References Cited

U.S. PATENT DOCUMENTS

| | | | | |
|---|---|---|---|---|
| 4,827,113 A | | 5/1989 | Rikuna | ........................ 235/432 |
| 5,734,444 A | * | 3/1998 | Yoshinobu | .................... 725/14 |
| 5,758,259 A | * | 5/1998 | Lawler | ........................ 725/45 |
| 2003/0217365 A1 | * | 11/2003 | Caputo | ........................ 725/95 |
| 2004/0024777 A1 | * | 2/2004 | Schaffer | ................. 707/103 R |

FOREIGN PATENT DOCUMENTS

| | | | | |
|---|---|---|---|---|
| EP | 0271807 A2 | 6/1988 | ........... | G06F/11/16 |
| EP | 0605054 A2 | 7/1994 | ........... | G06F/15/16 |
| EP | 0744867 | 11/1996 | ............ | H04N/7/16 |
| WO | WO9202791 | 2/1992 | ............. | G01J/1/02 |

OTHER PUBLICATIONS

B.D. Sheth, "A Learning Approach to Personalized Information Filtering", MSC Thesis, Online, Feb. 1994, pp. 1–75, XP002178871.

* cited by examiner

*Primary Examiner*—Chris Grant
*Assistant Examiner*—James Sheleheda
(74) *Attorney, Agent, or Firm*—Edward W. Goodman

(57) ABSTRACT

A method and apparatus are disclosed for validating recommendations generated by a television program recommender using programmed viewing agents. A viewing agent is programmed with a set of rules that characterize the viewing preferences of a modeled viewer. During a training phase, the programmed rules of a viewing agent are applied to a set of training programs to obtain an agent viewing history. The method and apparatus estimates the required size of the viewing history to provide a given level of accuracy. The viewing agents can be programmed to introduce one or more random shows into the viewing history, or to change the preferences of the viewing agent over time, thereby allowing the television program recommender validator to evaluate how the program recommender processes such non-stationaries.

8 Claims, 7 Drawing Sheets

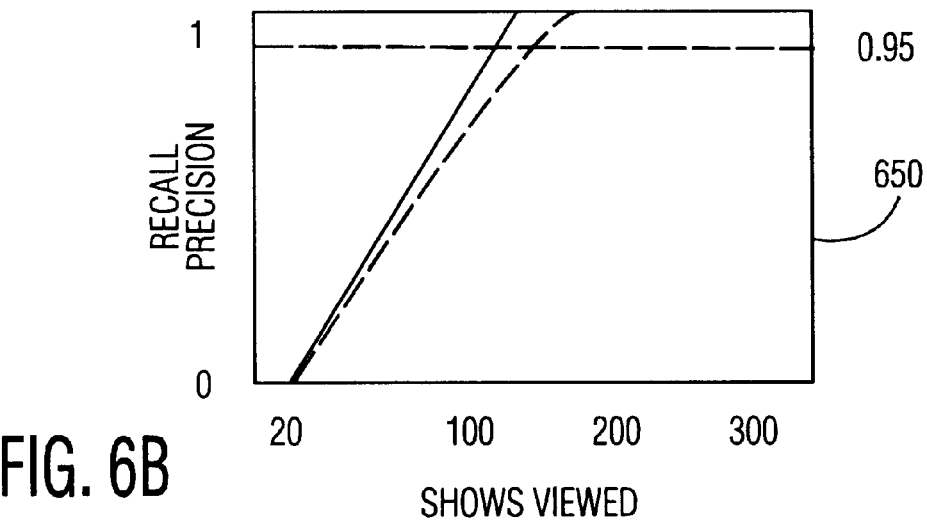
FIG. 6A
FIG. 6B
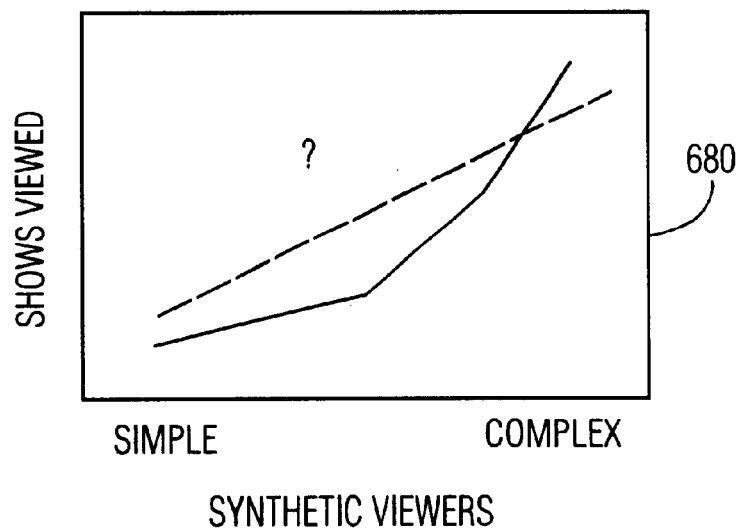
FIG. 6C

METHOD AND APPARATUS FOR EVALUATING TELEVISION PROGRAM RECOMMENDERS

FIELD OF THE INVENTION

The present invention relates to methods and apparatus for recommending television programming, and more particularly, to techniques for evaluating television program recommenders.

BACKGROUND OF THE INVENTION

As the number of channels available to television viewers has increased, along with the diversity of the programming content available on such channels, it has become increasingly challenging for television viewers to identify television programs of interest. Historically, television viewers identified television programs of interest by analyzing printed television program guides. Typically, such printed television program guides contained grids listing the available television programs by time and date, channel and title. As the number of television programs has increased, it has become increasingly difficult to effectively identify desirable television programs using such printed guides.

More recently, television program guides have become available in an electronic format, often referred to as electronic program guides (EPGs). Like printed television program guides, EPGs contain grids listing the available television programs by time and date, channel and title. Some EPGs, however, allow television viewers to sort or search the available television programs in accordance with personalized preferences. In addition, EPGs allow for on-screen presentation of the available television programs.

While EPGs allow viewers to identify desirable programs more efficiently than conventional printed guides, they suffer from a number of limitations, which if overcome, could further enhance the ability of viewers to identify desirable programs. For example, many viewers have a particular preference towards, or bias against, certain categories of programming, such as action-based programs or sports programming. Thus, the viewer preferences can be applied to the EPG to obtain a set of recommended programs that may be of interest to a particular viewer.

Thus, a number of tools have been proposed or suggested for recommending television programming. The Tivo™ system, for example, commercially available from Tivo, Inc., of Sunnyvale, Calif., allows viewers to rate shows using a "Thumbs Up and Thumbs Down" feature and thereby indicate programs that the viewer likes and dislikes, respectively. Thereafter, the TiVo receiver matches the recorded viewer preferences with received program data, such as an EPG, to make recommendations tailored to each viewer.

There is currently no way, however, to validate the recommendations generated by such tools for recommending television programming, short of testing the tools with human volunteers. In addition, there is no way to determine when the recommendations have achieved a given level of accuracy. A need therefore exists for a method and apparatus for validating recommendations generated by a television program recommender. A further need exists for a method and apparatus for determining when the size of the viewing history (record of shows watched/not watched) is sufficient to provide a given level of accuracy.

SUMMARY OF THE INVENTION

Generally, a method and apparatus are disclosed for evaluating the effectiveness of a television program recommender by evaluating program recommendations generated by the television program recommender for one or more programmed viewing agents. A viewing agent is programmed with a set of rules that characterize the viewing preferences of a modeled viewer. Viewing agents of varying complexity and having varying program preferences can be constructed by defining various rules that characterize program attributes, such as genre, actors and program duration.

During a training phase of the present invention, a viewing agent containing the programmed rules is applied to a set of training programs from an electronic program guide (EPG) to algorithmically obtain an agent viewing history, indicating whether the viewing agent would have liked or disliked each training program. The generated agent viewing history is then processed by the profiler portion of the television program recommender being evaluated. The profiler derives an agent profile containing a set of inferred rules that attempt to mimic the programmed preferences of the viewing agent. Thus, the profiler attempts to derive the viewing habits of the viewing agent based on the set of programs that the viewing agent liked or disliked.

During an evaluation phase of the present invention, the programmed rules of the viewing agent are applied to test data from an electronic program guide (EPG) to obtain an agent evaluation viewing set. In parallel, the television program recommender generates a set of program recommendations by applying the agent profile generated during the training phase to the test data from the electronic program guide (EPG). The present invention can then compare the agent evaluation viewing set (generated from the programmed rules) with a set of program recommendations produced by the television program recommender being evaluated (generated from the inferred rules). In this manner, the effectiveness of the television program recommender can be evaluated.

According to another aspect of the invention, a method and apparatus are disclosed for determining the required size of the viewing history to provide a given level of accuracy. Generally, the size of the required viewing history can be obtained by utilizing viewing histories of varying sizes for the same viewing agent. Thereafter, the size of the viewing history required to exceed a predefined accuracy threshold can be obtained.

The viewing agents can be programmed to introduce one or more random shows into the viewing history, allowing the television program recommender validator to determine how the program recommender processes such noise. In a further variation, the viewing agents can be programmed to gradually change the programmed viewer preferences over time, allowing the television program recommender validator to determine how the program recommender responds to such changes.

A more complete understanding of the present invention, as well as further features and advantages of the present invention, will be obtained by reference to the following detailed description and drawings.

BRIEF DESCRIPTION OF THE DRAWINGS

FIG. 6A illustrates a confusion matrix that analyzes whether a viewing agent would have liked a given show according to the programmed preferences and whether the program recommender actually recommended the show;

FIG. 6B illustrates a plot of the precision and recall values of the training data as a function of the number of shows viewed (size of viewing history); and FIG. 6C illustrates a plot of the number of shows viewed varying as a function of the complexity of the viewing agent.

DETAILED DESCRIPTION

Figure 1A:
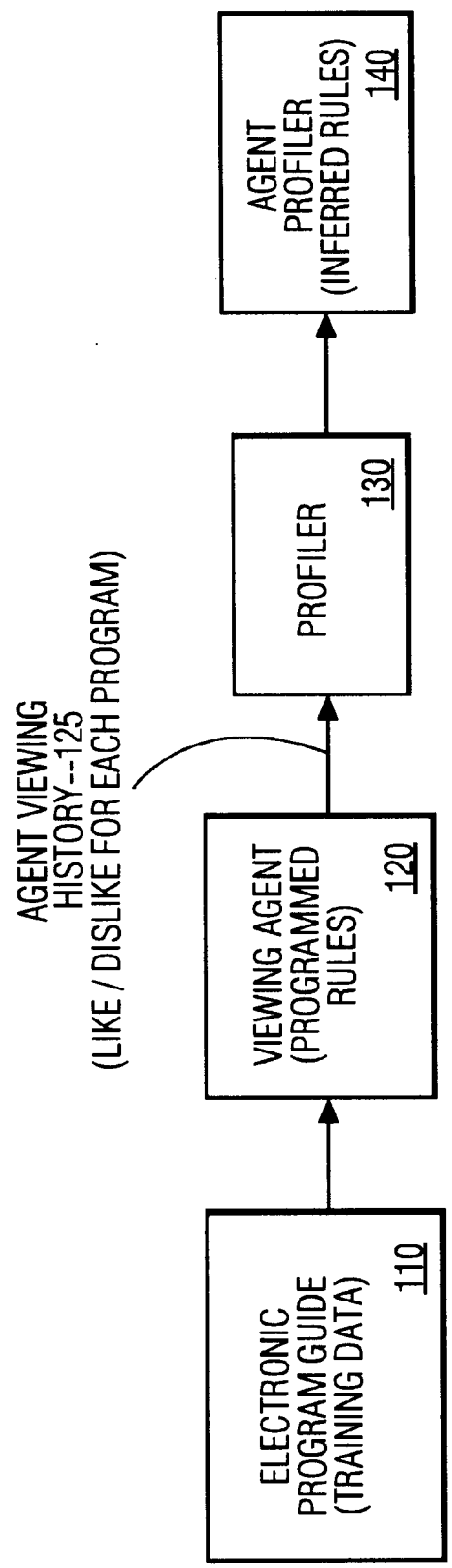
FIG. 1A illustrates a television program recommender validator in accordance with a training phase of the present invention.
Figure 1B:
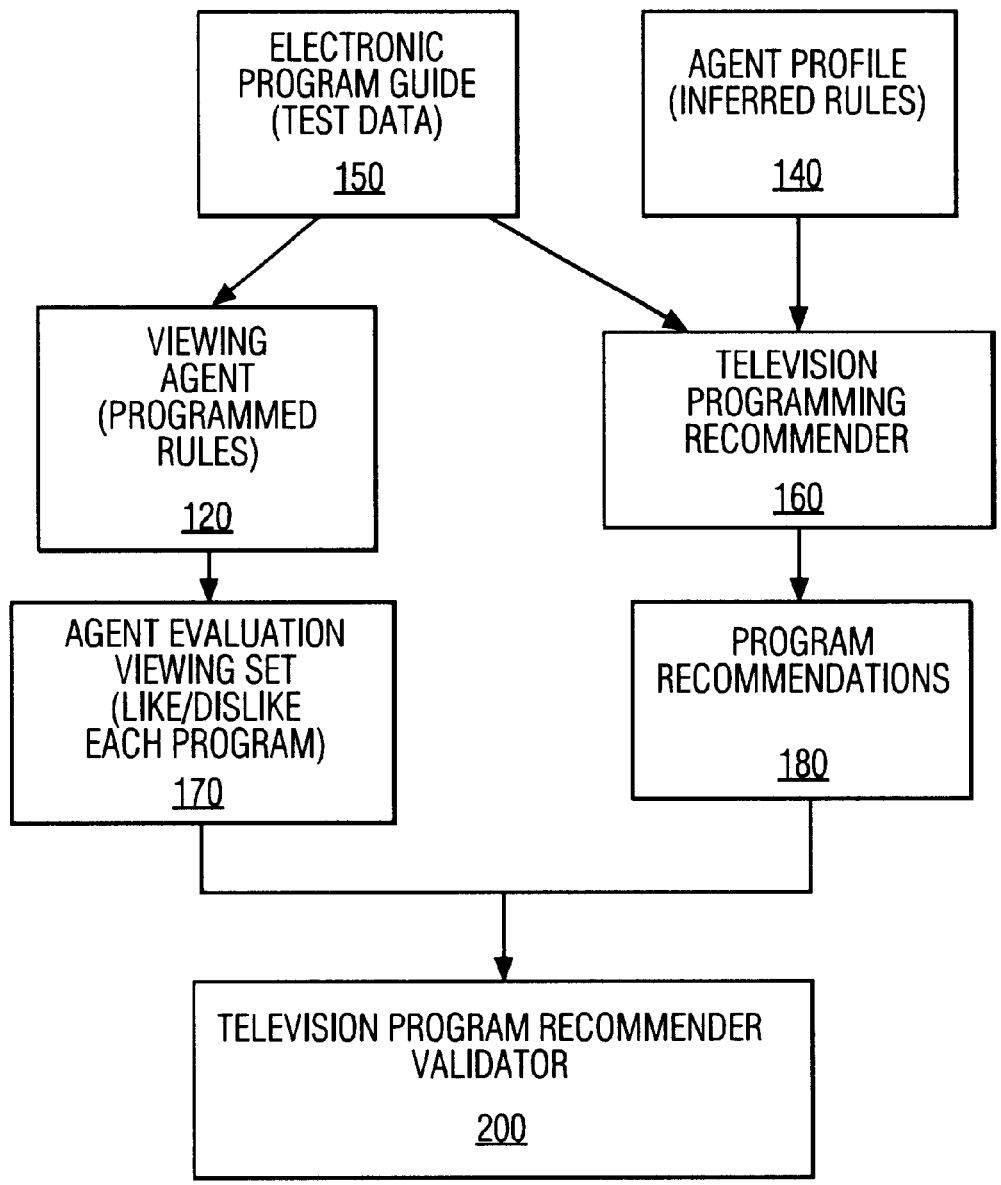
FIG. 1B illustrates a television program recommender validator in accordance with an evaluation phase of the present invention.

FIGS. 1A and 1B illustrate a television program recommender validator 200, discussed further below in conjunction with FIG. 2, in accordance with a training phase and evaluation phase, respectively, of the present invention. According to one aspect of the present invention, the television program recommender validator 200 evaluates the effectiveness of a television program recommender 160 by evaluating program recommendations generated by the television program recommender 160 for one or more programmed viewing agents 120 (or algorithmic viewers). As used herein, a viewing agent 120 is any programmed viewer whose viewing habits are predetermined. Each viewing agent 120 is programmed with a set of rules that categorize the viewing preferences of the modeled viewer.

Viewing agents 120 of varying complexity and having varying program preferences can be constructed in accordance with the present invention by defining various rules that characterize programs by their attributes. For example, a viewing agent 120 may be programmed with a strong preference for programs that belong to one or more particular genres, such as the "action" genre. In further variations, viewing agents 120 may be programmed with a preference for shows containing one or more identified actors and having a given duration.

For example, if a viewing agent 120 is programmed with a strong preference for programs that belong to the action genre, all action shows should be identified by the program recommender 160. The programs identified directly from the programmed rules of the viewing agent 120 in accordance with the present invention can be compared with the program recommendations 130 produced by the television program recommender 160 utilizing inferred rules contained in an agent profile 140. In this manner, the effectiveness of the television program recommender 160 can be evaluated.

According to another aspect of the invention, the television program recommender validator 200 estimates the size of the viewing history needed for the television program recommender 160 to provide results with a predefined reliability. Generally, the size of the required viewing history can be obtained by utilizing viewing histories of varying sizes for the same viewing agent 120. Thereafter, the size of the viewing history required to exceed a predefined accuracy can be obtained.

The present invention can evaluate any television program recommender 160, such as the television program recommenders 160 described in U.S. Pat. No. 6,727,914, entitled "Method and Apparatus for Recommending Television Programming Using Decision Trees," and U.S. patent application Ser. No. 09/498,271, filed Feb. 4 2000, entitled "Adaptive TV Program Recommender," or the Tivo™ system, commercially available from Tivo, Inc., of Sunnyvale, Calif. It is noted that the profiler 130 is generally a component of the television program recommender 160.

Training Phase

FIG. 1A illustrates a training phase of the present invention. The present invention applies the viewing agent 120 containing the programmed rules to a set of training programs from an electronic program guide (EPG) 110 to algorithmically obtain an agent viewing history 125. The agent viewing history 125 indicates whether the viewing agent 120 would have liked or disliked each of the training programs 110.

As shown in FIG. 1A, the profiler portion 130 of the television program recommender 160 (FIG. 1B) being evaluated then processes the agent viewing history 125 to derive an agent profile 140 containing a set of inferred rules that mimic the programmed preferences of the viewing agent 120. Thus, the profiler 130 attempts to derive the viewing habits of the viewing agent 120 based on the set of programs that the viewing agent 120 liked or disliked. Generally, more accurate program recommenders 160 will generate sets of inferred rules that more closely resemble the programmed rules of the viewing agent 120.

Evaluation Phase

FIG. 1B illustrates an evaluation phase of the present invention. Generally, the evaluation phase applies the programmed rules of the viewing agent 120 to a set of test data 150 from an electronic program guide (EPG) to obtain an agent evaluation viewing set 170. The television program recommender validator 200 then compares the agent evaluation viewing set 170 with a set of program recommendations 180 produced by the television program recommender 160 being evaluated. The television program recommender 160 generates the program recommendations 180 by applying the agent profile 140 generated during the training phase to the test data 150 from an electronic program guide (EPG).

Figure 2:
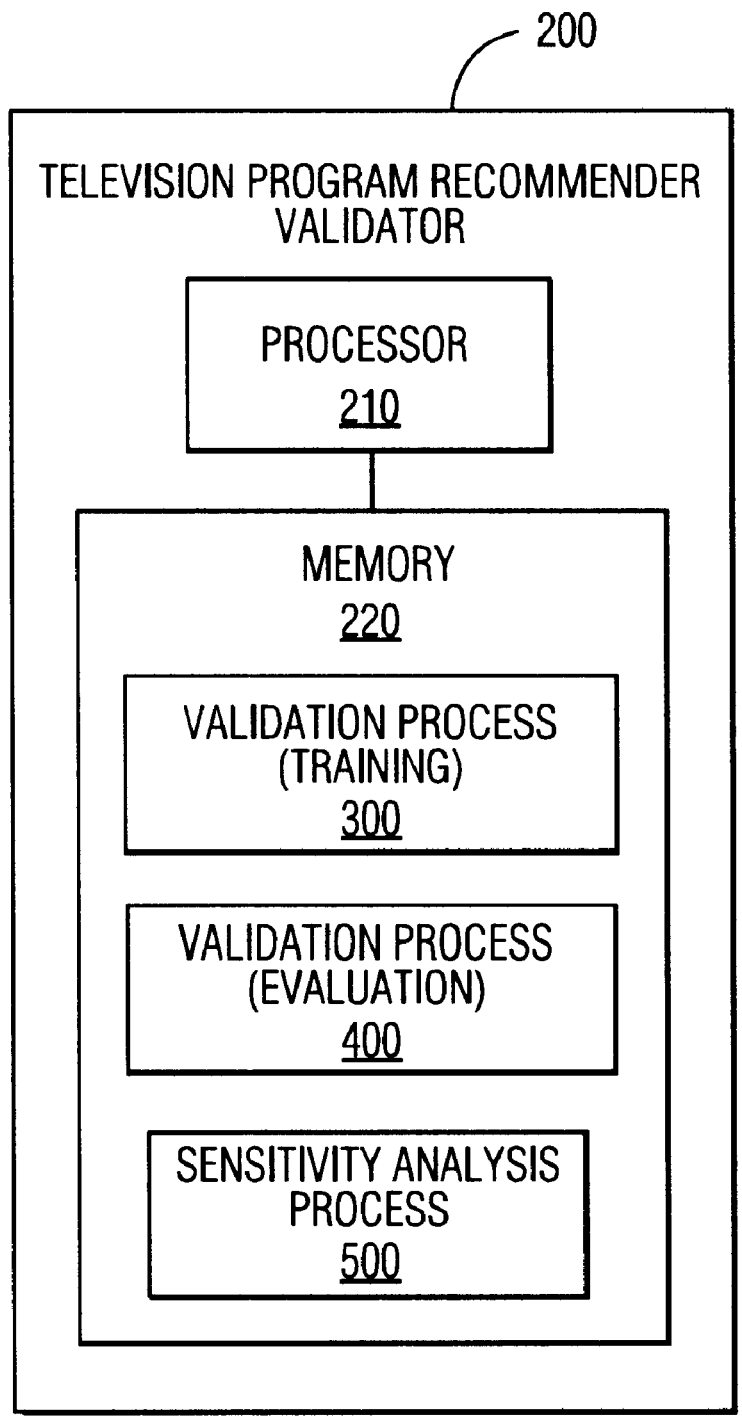
FIG. 2 is a schematic block diagram of the television program recommender validator of FIG. 1B.

FIG. 2 is a schematic block diagram of the television program recommender validator 200. The television program recommender validator 200 may be embodied as any computing device, such as a personal computer or workstation, that contains a processor 210, such as a central processing unit (CPU), and memory 220, such as RAM and ROM. As shown in FIG. 2, the program recommender validator 200 contains a validation process (training phase) 300, discussed further below in conjunction with FIG. 3, a validation process (evaluation phase) 400, discussed further below in conjunction with FIG. 4, and a sensitivity analysis process 500, discussed further below in conjunction with FIG. 5.

Generally, the validation process (training phase) 300 implements the training phase, discussed above, to generate the agent profile 140. The validation process (evaluation phase) 400 implements the evaluation phase, discussed above, to compare the agent evaluation viewing set 170 generated directly from the programmed rules for the viewing agent 120 with a set of program recommendations 180 produced by the television program recommender 160 being evaluated. The sensitivity analysis process 500 estimates the size of the viewing history needed for the television program recommender 160 to provide results with a predefined reliability.

Figure 3:
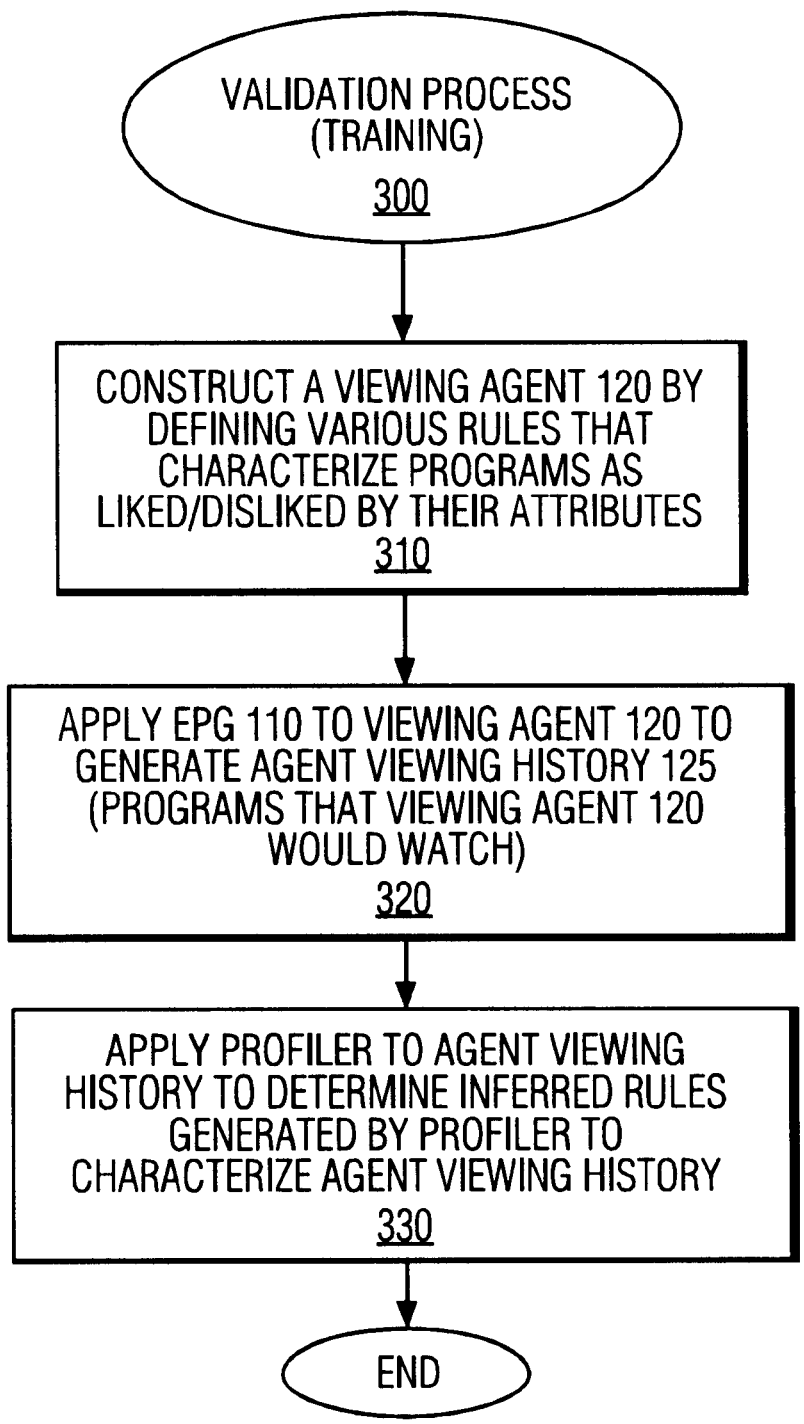
FIG. 3 is a flow chart describing the validation process (training phase) of FIG. 2 embodying principles of the present invention.

FIG. 3 is a flow chart describing the validation process (training phase) 300 embodying principles of the present invention. The validation process (training phase) 300 implements the training phase, discussed above, to generate the agent profile 140. As shown in FIG. 3, the validation process (training phase) 300 initially constructs a viewing agent 120 by defining various rules that characterize programs by their attributes as being liked or disliked during step 310. The test data from the electronic program guide (EPG) 110 is then applied to the programmed rules of the viewing agent 120 during step 320 to generate the agent viewing history 125.

Finally, the profiler 130 is applied to the agent viewing history 125 during step 330 to identify the inferred rules that characterize the agent viewing history 125. Program control then terminates.

Figure 4:
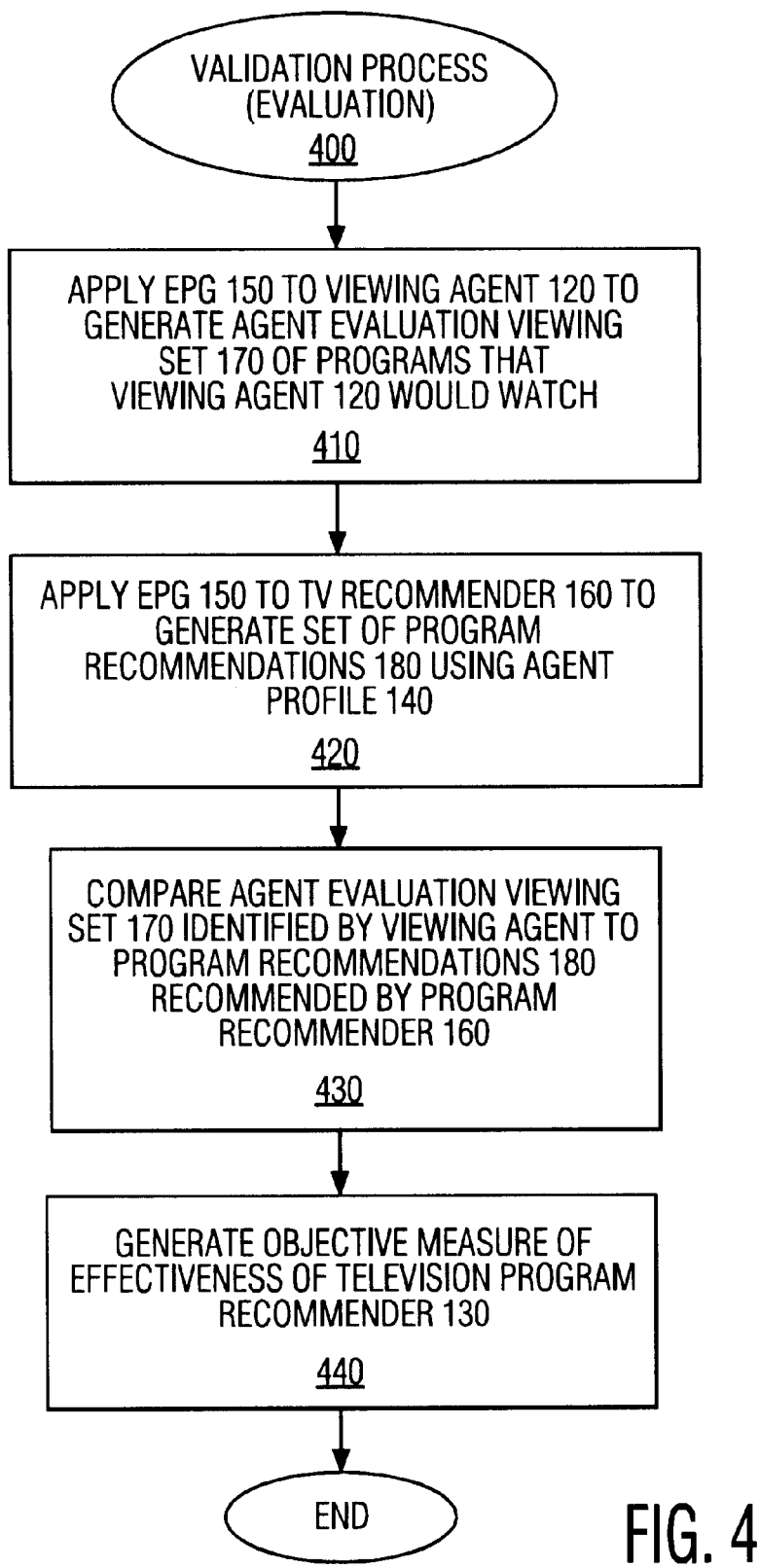
FIG. 4 is a flow chart describing the validation process (evaluation phase) of FIG. 2 embodying principles of the present invention.

FIG. 4 is a flow chart describing the validation process (evaluation phase) 400 embodying principles of the present invention. The validation process (evaluation phase) 400 implements the evaluation phase, discussed above, to compare the agent evaluation viewing set 170 generated directly from the programmed rules for the viewing agent 120 with a set of program recommendations 180 produced by the television program recommender 160 being evaluated.

As shown in FIG. 4, the validation process (evaluation phase) 400 initially applies the test data from the EPG 150 to the programmed rules of the viewing agent 120 during step 410 to generate the agent evaluation viewing set 170 indicating programs that the programmed viewing agent 120 would watch. Thereafter, the validation process (evaluation phase) 400 applies the test data from the EPG 150 to the TV recommender 160, using the agent profile 140 generated during the training phase, to generate a set of program recommendations 180 during step 420.

During step 430, the validation process (evaluation phase) 400 then compares the set of programs 170 identified during step 410 from the program rules with the set of program recommendations 180 identified by the program recommender 160 during step 420 from the inferred rules.

Finally, the effectiveness of the television program recommender 160 can be evaluated during step 440, based on the comparison. For example, the effectiveness of the television program recommender 160 can be evaluated using well-known pattern recognition techniques, such as the mean square error, precision and recall (discussed below) or receiver operator characteristic curves. Program control then terminates.

Figure 5:
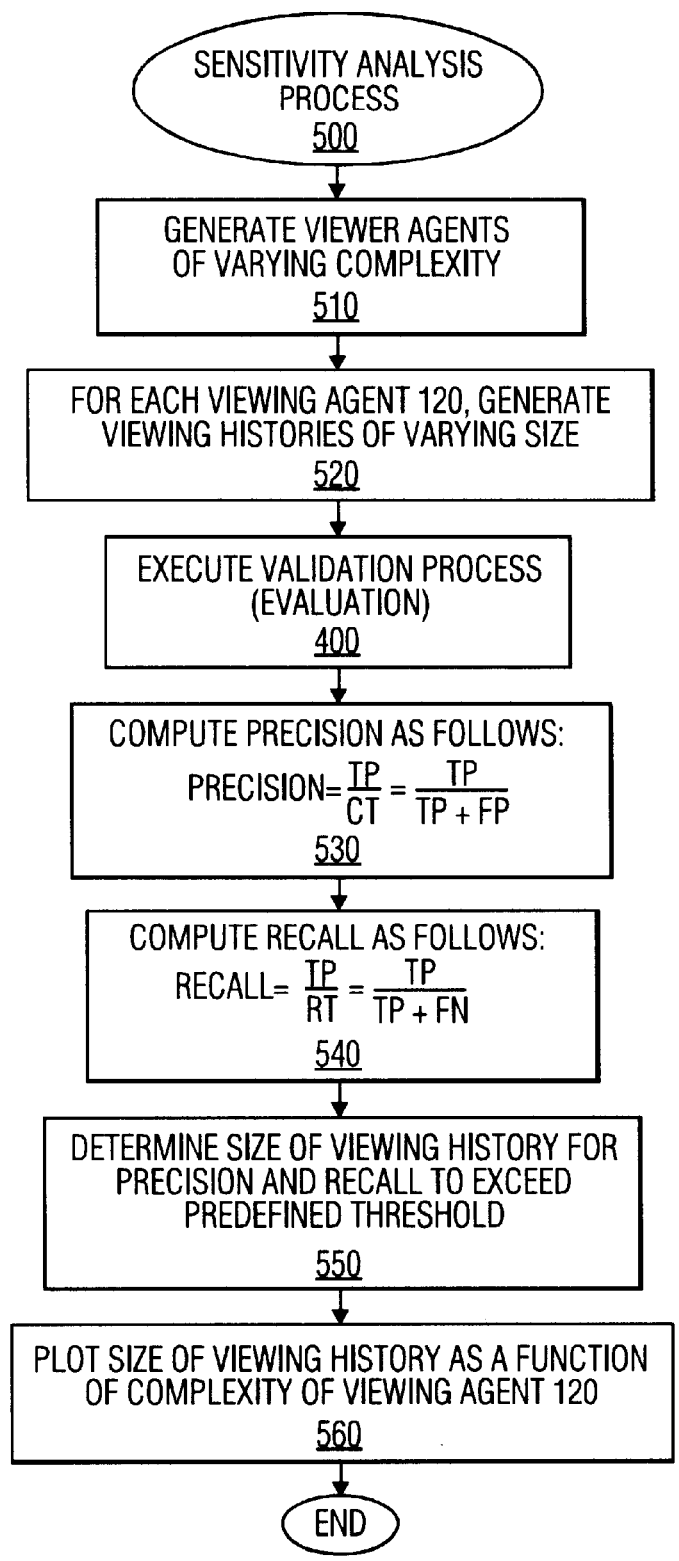
FIG. 5 is a flow chart describing the sensitivity analysis process of FIG. 2 embodying principles of the present invention.

FIG. 5 is a flow chart describing the sensitivity analysis process 500 embodying principles of the present invention. Generally, the sensitivity analysis process 500 estimates the size of the viewing history needed for the television program recommender 160 to provide results with a predefined reliability or accuracy.

As shown in FIG. 5, the sensitivity analysis process 300 initially generates viewer agents of varying complexity during step 510. For each viewing agent 120, the sensitivity analysis process 500 then generates viewing histories of varying size during step 520. The validation process (evaluation) 400 is then executed during step 525 for each viewing history size and viewing agent 120 to compare the agent evaluation viewing set 170 generated directly from the programmed rules for the viewing agent 120 with a set of program recommendations 180 produced by the television program recommender 160 being evaluated.

Thereafter, for each viewing history size and viewing agent 120, the sensitivity analysis process 500 computes the precision of the recommendations during step 530 as follows:

$$Precision = \frac{TP}{CT} = \frac{TP}{TP+FP},$$

where TP indicates the true positives, FP indicates the false positives, and the column total, CT, is equal to the TP plus the FP.

In addition, for each viewing history size and viewing agent 120, the sensitivity analysis process 500 computes the recall of the training data during step 540 as follows:

$$Recall = \frac{TP}{RT} = \frac{TP}{TP+FN},$$

where FN indicates the false negatives and the row total, RT, is equal to TP plus FN.

The concepts and calculations for precision and recall are discussed further below in conjunction with FIG. 6A. The required size of the viewing history for the precision and recall to exceed a predefined threshold is then determined during step 550 and the size of viewing history is plotted as a function of the complexity of the viewing agent 120 during step 560. Program control then terminates.

Sensitivity Analysis

FIG. 6A illustrates a well-known confusion matrix 600 that analyzes whether the viewing agent 120 would have liked a given show according to the programmed preferences (satisfied rules in profile), and whether the program recommender 160 actually recommended the show. The confusion matrix 600 indicates the true positives (TP), false positives (FP), true negatives (TN) and false negatives (FN). The confusion matrix 600 also indicates the row total (RT=TP+FN) and the column total (CT=TP+FP).

In accordance with well-known pattern recognition techniques, such as those described in Boreczky and Rowe, "Comparison of Video Shot Boundary Detection Techniques," SPIE, Vol. 2670, 170–79 (1996), incorporated by reference herein, the precision and recall of the training set can be evaluated according to the following expressions:

$$Precision = \frac{TP}{CT} = \frac{TP}{TP+FP}$$

$$Recall = \frac{TP}{RT} = \frac{TP}{TP+FN}$$

FIG. 6B illustrates a plot 650 of the precision and recall values as a function of the number of shows viewed (size of the viewing history). The precision and recall values vary between values of zero and one, and generally increase as the size of the viewing history increases. To obtain a desired degree of accuracy in accordance with the present invention, the size of the viewing history can be adjusted such that both the precision and recall values exceed a predefined threshold.

FIG. 6C illustrates a plot 680 of the size of the viewing history needed to achieve a given level of accuracy or reliability, as a function of the complexity of the viewing agent 120. Clearly, the number of shows that must be included in the viewing history must be increased to achieve a given accuracy level as the complexity of the viewing agent 120 increases.

In one variation, the viewing agents 120 can be programmed to introduce one or more random shows into the viewing history 125 and thereby determine how the program recommender 160 processes such noise. In a further variation, the viewing agents 120 can be programmed to gradually change the programmed viewer preferences over time, and thereby determine how the program recommender 160 responds to such changes.

It is to be understood that the embodiments and variations shown and described herein are merely illustrative of the principles of this invention and that various modifications may be implemented by those skilled in the art without departing from the scope and spirit of the invention.

What is claimed is:

1. A method for determining the required size of a viewing history for a program recommender to provide a given level of accuracy, said method comprising the steps of:

generating a plurality of viewer agents of varying complexity;

generating viewing histories of varying size for each of said viewing agents;

determining the precision for each viewing history size and viewing agent;

determining the recall for each viewing history size and viewing agent; and determining a required size for said viewing history such that said precision and recall values exceed a predefined threshold.

2. The method of claim 1, wherein said precision is determined from the true positives (TP) and false positives (FP) as follows:

$$Precision = \frac{TP}{CT} = \frac{TP}{TP + FP}$$

wherein CT is column total.

3. The method of claim 1, wherein said recall is determined from the true positives (TP) and false negatives (FN) as follows:

$$Recall = \frac{TP}{RT} = \frac{TP}{TP + FN}$$

wherein RT is row total.

4. A method for determining the required size of a viewing history for a program recommender to provide a given level of accuracy for a user, said method comprising the steps of:

generating a viewing agent using one or more programmed rules that characterize viewing preferences;

generating a plurality of viewing histories of varying sizes for said viewing agent;

determining the precision for each viewing history;

determining the recall for each viewing history; and determining a required size for said viewing history such that said precision and recall values exceed a predefined threshold.

5. A method for determining the required size of a viewing history for a program recommender to provide a given level of accuracy, said method comprising the steps of:

generating a plurality of viewer agents with varying program preferences;

generating viewing histories of varying size for each of said viewing agents;

determining the precision for each viewing history size and viewing agent;

determining the recall for each viewing history size and viewing agent; and determining a required size for said viewing history such that said precision and recall values exceed a predefined threshold.

6. A system for determining the required size of a viewing history for a program recommender to provide a given level of accuracy, comprising:

a memory for storing computer readable code; and a processor operatively coupled to said memory, said processor configured to:

generate a plurality of viewer agents of varying complexity;

generate viewing histories of varying size for each of said viewing agents;

determine the precision for each viewing history size and viewing agent;

determine the recall for each viewing history size and viewing agent; and determine a required size for said viewing history such that said precision and recall values exceed a predefined threshold.

7. A system for determining the required size of a viewing history for a program recommender to provide a given level of accuracy for a user, comprising:

a memory for storing computer readable code; and a processor operatively coupled to said memory, said processor configured to:

generate a viewing agent using one or more programmed rules that characterize viewing preferences;

generate a plurality of viewing histories of varying sizes for said viewing agent;

determine the precision for each viewing history;

determine the recall for each viewing history; and determine a required size for said viewing history such that said precision and recall values exceed a predefined threshold.

8. A system for determining the required size of a viewing history for a program recommender to provide a given level of accuracy, comprising:

a memory for storing computer readable code; and a processor operatively coupled to said memory, said processor configured to:

generate a plurality of viewer agents with varying program preferences;

generate viewing histories of varying size for each of said viewing agents;

determine the precision for each viewing history size and viewing agent;

determine the recall for each viewing history size and viewing agent; and determine a required size for said viewing history such that said precision and recall values exceed a predefined threshold.

* * * * *